United States Patent [19]

Fergason

[11] 4,037,062

[45] July 19, 1977

[54] LIQUID CRYSTAL ELECTROMECHANICAL TRANSDUCER

[76] Inventor: James L. Fergason, 5806 Horning Road, Kent, Ohio 44240

[21] Appl. No.: 715,707

[22] Filed: Aug. 19, 1976

[51] Int. Cl.² .................... H04R 23/00; H02N 11/00
[52] U.S. Cl. .................................................. 179/133
[58] Field of Search ............... 179/111 R, 121 R, 133, 179/138; 310/2, 5, 6

Primary Examiner—George G. Stellar
Attorney, Agent, or Firm—Brown, Murray, Flick & Peckham

[57] ABSTRACT

Described are electromechanical transducers, particularly electroacoustic transducers for use in microphones and the like, which utilize a change in the direction of alignment of liquid crystal molecules to vary the capacitance of a capacitor formed by a layer of liquid crystal material disposed between conductive films or plates.

6 Claims, 5 Drawing Figures

LIQUID CRYSTAL ELECTROMECHANICAL TRANSDUCER

BACKGROUND OF THE INVENTION

While not limited thereto, the present invention is particularly adapted for use as an electroacoustic transducer in microphones. As is known, the usual microphone is of either the carbon type or the condenser type. In the carbon microphone, carbon granules are compressed to a greater or lesser degree by a diaphragm, so that their resistance varies with the acoustic pressure. This, in turn, produces corresponding fluctuations in the current whicch can be transmitted to a receiver. In the condenser microphone, on the other hand, a flexible diaphragm is utilized in conjunction with a fixed counterelectrode to form an air condenser whose capacitor varies with the vibrations of the diaphragm. Consequently, a direct voltage applied in the circuit has an alternating voltage superimposed on it corresponding to the sound waves impinging on the diaphragm.

Such microphones, while used extensively in the past, are essentially high input impedance devices and, consequently, require that the electrical signal derived from the carbon granules, for example, must be amplified extensively before it can be transmitted.

SUMMARY OF THE INVENTION

In accordance with the present invention, a new and improved electromechanical transducer, particularly an electroacoustic transducer, is provided in which a nematic liquid crystal material is used as a dielectric between capacitor plates. A characteristic of nematic liquid crystals resides in the fact that they have a dielectric coefficient dependent on the direction of orientation of the long axes of the liquid crystal molecules with respect to an applied electric field. If the dielectric coefficient is a maximum when the long axes are aligned with the field, the material is said to have a positive dielectric anisotropy. The molecules in a nematic liquid crystal material of positive dielectric anisotropy, when placed between parallel plates, tend to lie with their long axes parallel to the plates, like straws in a broom. However, when an electrical field is applied between the plates, and assuming that a threshold voltage is exceeded, the long axes become normal or perpendicular to the plates. Under these circumstances, the capacitor formed by the plates with the liquid crystal material therebetween gives maximum capacitance.

Now, if the direction of alignment of the long axes of the liquid crystal molecules is caused to change gradually from positiong where they are normal to the plates to positions where they are parallel to the plates, the capacitance will decrease. In many cases, depending upon the alignment of the liquid crystal molecules, the ratio of the dielectric coefficients from one position of alignment to another may be as large as 5 to 1. Thus, a capacitor utilizing a nematic liquid crystal material can have a capacitance of either 1 microfarad or 5 microfarads, depending upon the alignment of the nematic molecules. Consider, for example, a low-loss liquid crystal capacitor with a dielectric ratio of 5 to 1 with a charge sufficient to charge the capacitor to 5 volts. If this is a capacitor having a 5 microfarad capacitance, the charge stored would be 25 coulombs. If, by some means, the direction of the alignment is changed, the voltage across the capacitor will increase to 25 volts. When a nematic liquid crystal is caused to flow, the direction of alignment tends to change in the direction of flow. This principle is utilized in the present invention for providing an electromechanical transducer of low input impedance capable of changing capacitance drastically in response to mechanical movement.

The above and other objects and features of the invention will become apparent from the following detailed description taken in connection with the accompanying drawings which form a part of this specification, and in which.

Figure 1:
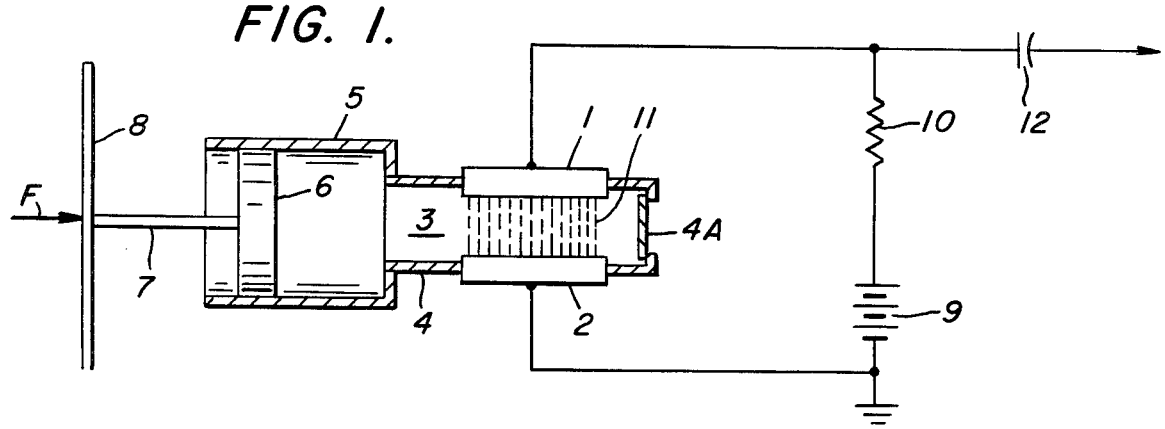
FIG. 1 is a schematic illustration of one embodiment of the invention for converting mechanical movement into electrical wave energy.

With reference now to the drawings, and particularly to FIG. 1, there is shown a capacitor comprising a pair of conducting plates 1 and 2 having disposed between the plates a liquid crystal material 3 of positive dielectric anisotropy. The liquid crystal material 3 is contained within a chamber 4 which communicates with a cylinder 5 having a piston 6 reciprocable therein. Chamber 4 preferably has a flexible membrane 4A at the end thereof opposite piston 6. The piston 6 is connected through a rod 7 to, for example, a diaphragm 8 which will bend in response to a mechanical force F. If the liquid crystal 3 is of the positive dielectric anisotropy type, a suitable material can be prepared by mixing together 30 grams of p-pentylphenyl-p-methoxybenzoate, 16 grams of p-pentylphenyl-p-pentyloxybenzoate, 8 grams of p-cyanophenyl-p-octyloxybenzoate, 11 grams of p-cyanobenzylidine-p-butylaniline, 7 grams of p-cyanophenyl-p-heptyloxybenzoate, 6 grams of p-cyanopheyl-p-pentyloxbenzoate, and 22 grams of p-cyanophenyl-p-heptylbenzoate. The materials are heated and stirred until the clearing point (57.3° C) is reached. Other and different nematic liquid crystal materials of positive dielectric anisotropy can be used to suit requirements; and, under certain circumstances, a material of negative dielectric anisotropy can be used as will be explained hereinafter.

Figure 1A:
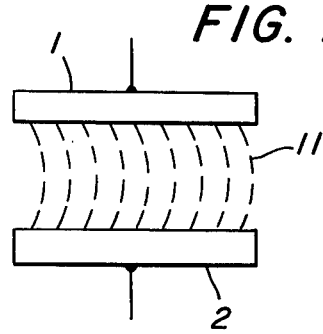
FIG. 1A is an enlarged view of the capacitor plates of the device of FIG. 1, showing the manner in which the nematic liquid crystal molecules are bent in response to flow of a liquid crystal material.

It is a characteristic of such liquid crystal materials that the molecules therein are long and straight and lie parallel to each other like straws in a broom. In the absence of an electrical field applied across the liquid crystal material, the long axes of the molecules tend to align parallel to the two plates. However, when an electrical field is applied across a nematic liquid crystal of positive dielectric anisotropy, the long axes of the molecules become normal or perpendicular to the plates. Thus, assuming that a battery 9 and resistor 10 are connected across the plates 1 and 2 as shown in FIG. 1 and that the voltage across the plates exceeds a threshold voltage, the molecules 11 will have their long axes normal to the plates 1 and 2. Now, if pressure is applied to the piston 6 such that the liquid crystal material within the chamber 3 tends to flow to the right as viewed in FIG. 1, for example, the long axes of the molecules 11 will bend as shown in FIG. 1A, giving rise to a large change in capacitance between the plates 1 and 2. Assuming that the piston 6 is vibrating, therefore, this change in capacitance will give rise to an alternating current signal superimposed on the direct current voltage from battery 9; and this can be coupled through capacitor 12 to suitable utilization apparatus. Membrane 4A permits the liquid crystal to flow easily in response to movement of piston 6.

Assuming that the diaphragm 8 is caused to vibrate in response to acoustic wave energy, it will be appreciated that the device becomes an electroacoustic transducer which can be used in micrphones and the like.

As was explained above, in the case of a nematic liquid crystal material of positive dielectric anisotropy, the long axes of the nematic molecules will lie parallel to the plates until a threshold voltage is reached, whereupon they will become normal to the plates. Depending upon the type of positive material used, the threshold voltage can be anywhere from about 1½ to 4 volts. When the voltage across the capacitor is beneath the threshold voltage of a positive material, therefore, a positive material cannot be used in the capacitor. In this case, (i.e., where the capacitor has a voltage thereacross which is less than the threshold voltage of a positive material), a nematic liquid crystal material of negative dielectric anisotropy can be employed. In this case, the opposing plates of the capacitor are treated with a polymer, such as lecithin or silane which will cause the negative nematic molecules to assume positions where their long axes are normal to the plates in the absence of an applied field. As the field and voltage across the plates are increased, a threshold will be reached where the long axes become parallel to the plates. However, below this threshold voltage, the molecules of the negative material tend to align normal to the plates but will, nevertheless, bend or become misaligned in response to the flow of the liquid crystal material. Hence, at lower voltages, beneath the threshold voltage of a positive material, a negative nematic liquid crystal material can be employed provided that the surfaces of the plates are initially treated to cause the negative molecules to become normal to the plates.

Figure 2:
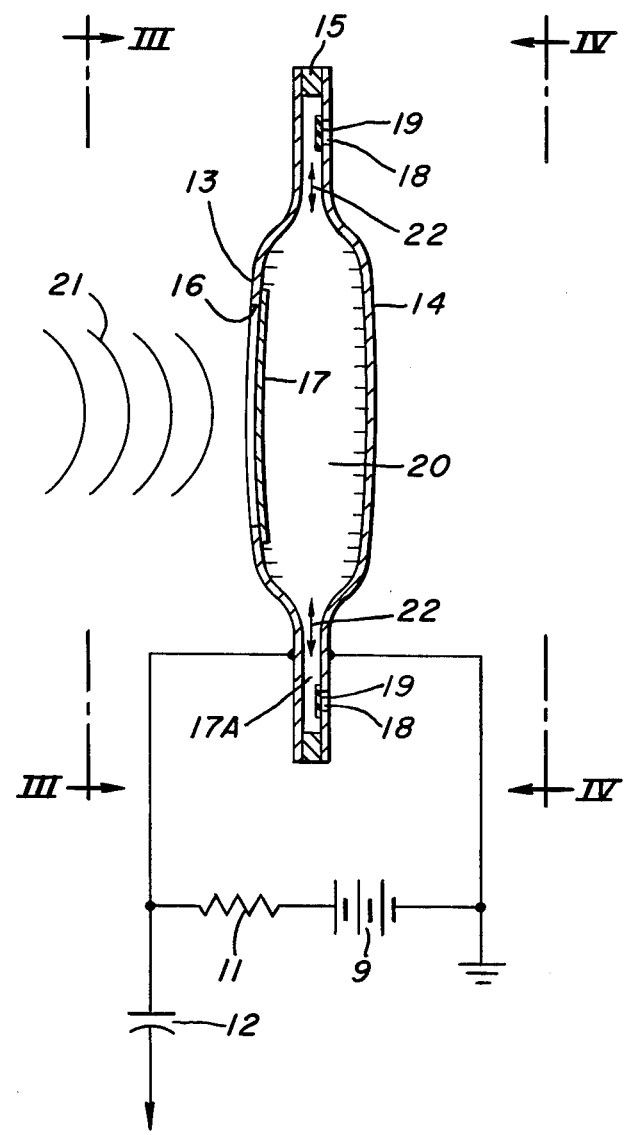
FIG. 2 is a schematic illustration of a type of electroacoustic transducer constructed in accordance with the teachings of the invention.
Figure 3:
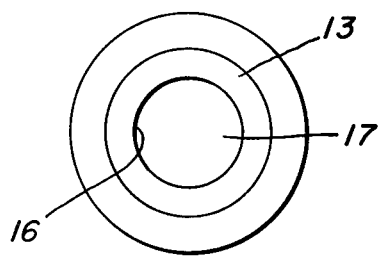
FIG. 3 is a front view of the device of FIG. 2 taken along line III—III of FIG. 2.
Figure 4:
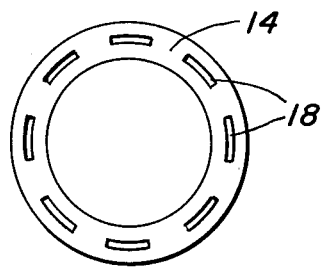
FIG. 4 is a back view of the device of FIG. 2 taken substantially along line IV—IV of FIG. 2.

In FIG. 2, another embodiment of the invention is shown which is particularly adapted for use in microphone applications and the like. It comprises two rigid, or at least semi-rigid, discs 13 and 14 spaced apart by an annular insulating spacer 15. The central region of the front disc 13 is cut away to provide a circular opening 16 which is covered with a thin, flexible membrane 17 (See FIG. 3). The annular area 17A surrounding the membrane 17 is necked-down as shown to reduce the distance between the discs or plates 13 and 14 (to maximize capacitance, and to provide a restricted region where flow in response to vibrations will be maximized. As best shown in FIG. 4, the outer periphery of the back disc 14 is provided with arcuate slots 18 around its periphery; and these also are covered with a thin, annular flexible membrane 19. The space between the discs 13 and 14 is filled with a nematic liquid crystal material which, assuming that the voltage of battery 9 is above the threshold voltage, will be a nematic liquid crystal material of positive dielectric anisotropy.

When the membrane 17 is subjected to audio-wave energy 21, for example, it will vibrate, causing the liquid crystal material 20 to flow back and forth along the direction of arrows 22 with the diaphragms 19 permitting easy movement of the liquid crystal material within the cavity formed between the discs 13 and 14. As a result, the capacitance between the discs 13 and 14 will vary and will generate an electrical signal which can be coupled through coupling capacitor 12 to electrical utilization apparatus, not shown.

The principles of the invention can also be used to generate power using a large plate area. By changing the direction of orientation of the liquid crystals, power can be generated. Losses in the system would depend on friction and the resistivity of the liquid crystal material. The invention can also be utilized to generate high voltage spikes by the electrical discharge of a number of liquid crystal capacitors in series with a mechanical force applied in parallel. Still another use for the device of the invention is as a pulse generator wherein an abrupt and sudden impulse on the liquid crystal material would generate a corresponding electrical pulse.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a device for converting mechanical movement into an electrical signal, the combination of a layer of nematic liquid crystal material disposed between spaced conductive plates, the nematic liquid crystal material being such that the long axes of its molecules will be substantially normal to the plates with a potential applied across the plates, means for causing said liquid crystal material to flow essentially parallel to the plates in response to mechanical motion, and means coupled to said plates for sensing a change in capacitance between the plates when the liquid crystal material flows therebetween and the long axes of the molecules are deflected from positions normal to the plates.

2. The device of claim 1 wherein said liquid crystal material is of positive dielectric anisotropy and said potential applied across the plates is above the threshold voltage of the positive nematic liquid crystal material.

3. The device of claim 1 wherein said liquid crystal material is of negative dielectric anisotropy, the plates being treated to cause the long axes of the nematic liquid crystal molecules of negative dielectric anisotropy to be normal to the plates in the absence of an applied electrical field, and wherein said electrical potential applied across the plates is below that at which the long axes of the negative nematic molecules will be parallel to the plates.

4. The device of claim 1 wherein acoustic wave energy is converted into electrical wave energy and wherein said means for causing the liquid crystal material to flow parallel to the plates comprises a flexible diaphragm responsive to acoustic wave energy.

5. The device of claim 4 wherein said conductive plates are separated by an insulating spacer extending around the peripheries of the plates, one of said plates having an opening therein covered with said flexible diaphragm.

6. The device of claim 5 wherein said opening in the one plate is centrally-disposed and including means extending around the periphery of one of the plates for permitting easy flow of the liquid crystal material in a direction parallel to the plates.

* * * * *